United States Patent [19]

Barczynski et al.

[11] 4,021,819

[45] May 3, 1977

[54] APPARATUS FOR FABRICATING A COLOR CATHODE RAY TUBE

[75] Inventors: J. Robert Barczynski, Waterloo, N.Y.; Milton L. Deffenbaugh, Columbus Grove; Melvin R. Hedrick, Ottawa, both of Ohio; Jerry F. Janssen, Seneca Falls, N.Y.

[73] Assignee: GTE Sylvania Incorporated, Stamford, Conn.

[22] Filed: Jan. 19, 1976

[21] Appl. No.: 650,017

Related U.S. Application Data

[62] Division of Ser. No. 557,966, March 13, 1975, Pat. No. 3,954,470.

[52] U.S. Cl. .................................................. 354/1

[51] Int. Cl.$^2$ ........................................ G03B 41/00

[58] Field of Search ........................ 354/1; 96/36.1; 313/479; 250/515

[56] References Cited

UNITED STATES PATENTS 3,762,284 10/1973 Park et al. ............................ 354/1

*Primary Examiner*—Richard A. Wintercorn
*Attorney, Agent, or Firm*—Norman J. O'Malley; Frederick H. Rinn; Robert T. Orner

[57] ABSTRACT

The invention provides conjunction apparatus for facilitating the fabrication of the basic pattern windowed-web portion of a color cathode ray tube screen structure formed in the viewing area of the face panel. In accordance with the invention, additional photo-exposure of the panel is discretely effected by the apparatus to polymerize a defined band of coating confined to the sidewall portion of the panel. The presence of this band subsequently facilitates expeditious removal of extraneous graphite coating from the panel sidewall, from the mask positioning studs embedded therein, and from the terminal sealing edge therearound. Thus, the apparatus of the invention provides desirably bare sidewall-associated surfaces that are free of deleterious particulate matter.

8 Claims, 9 Drawing Figures

APPARATUS FOR FABRICATING A COLOR CATHODE RAY TUBE

CROSS REFERENCE TO RELATED APPLICATION

This application is a divisional application of Ser. No. 557,966, filled in the United States Patent Office on Mar. 13, 1975, now U.S. Pat. No. 3,954,470 issued May 4, 1976, and assigned to the assignee of the present invention. This divisional application contains matter disclosed but not claimed in a related application, Ser. No. 557,877, which was filed on Mar. 13, 1975 now U.S. Pat. No. 3,955,094, issued May 4, 1976, and assigned to the assignee of the parent application, Ser. No. 557,966, Assignment recorded Mar. 13, 1975, Reel 3175, Frame 763.

BACKGROUND OF THE INVENTION

This invention relates to the manufacture of color cathode ray tubes and more particularly to apparatus for fabricating the basic structure of a patterned color screen on the viewing panel of a color cathode ray tube.

Cathode ray tubes capable of presenting multi-colored display imagery, such as those employed in color television applications, conventionally utilize face panels having viewing areas whereupon patterned screens are interiorly disposed; such screens being comprised of repetitive groupings of related cathodoluminescent phosphor materials. These screen groupings are normally disposed as bars, stripes, or dots depending upon the type of color structure under consideration. For example, in the well-known shadow mask tube construction, the screen pattern is conventionally composed of a vast multitude of similarly-shaped elements such as dots, or elongated areas formed of selected cathodoluminescent phosphors, which, upon predetermined excitation, produce additive primary hues to provide the desired color imagery. The individual phosphor elements comprising the screen pattern are sometimes in substantially tangential contact with one another, while the other instances, they are definitively separated by relatively small interstitial spacings purposely provided to enhance the color purity of the imagery by reducing the possibility of happenstantial electron excitation of adjacent elements. Associated with the screen and spaced therefrom is a foraminated structure or shadowmask which is supported within the face panel by a plurality of mask positioning means embedded in the encompassing sidewall portion of the panel. Each of the apertures of the mask pertains to a specific grouping of related elements of the screen pattern in a manner to enable the selected electron beams traversing the aperture to impinge the proper phosphor element therebeneath.

It has been found that brightness and contrast of the color screen image is markedly enhanced by disposing an opaque light-absorbing material in the interstitial spacing to effect a basic multi-windowed construction for defining the respective elements of the screen pattern. By such structure, each subsequently disposed phosphor element is defined by a substantially dark encompassment which collectively form a patterned window webbing having an array of substantially opaque connecting interstices. During fabrication of this basic web-like structure, one of the process steps involved coating the interior surface of the panel with the opaque material such as, for example, a graphite coating. It is important that this graphite coating be subsequently removed from the sealing edge of the panel and for a fixed distance therefrom up the sidewall of the panel to provide a peripherally defined outline of the basic widowed structure. Any residual graphite adhering to the sealing edge of the panel interferes with the subsequent formation of the hermetic jointure between the panel and the funnel. In addition, since graphite is electrically conductive, any particles thereof remaining on or around the mask supporting studs may be dislodged by movement of the mask locating members and thereby constitute a potential source of deleterious electrical shorts and arcing in the finished tube.

It is a desideratum from both aesthetic and quality considerations, that the basic windowed webbing of the screen structure be framed by a circumscribing opaque peripheral area having a smoothly defined trim line along the upper portion of the panel sidewall in the region proximal to the viewing area. Such definition is desired as subsequent aluminizing of the completed screen should overlay all of the screen area including the opaque periphery therearound. In the completed panel, the remainder of the sidewall below the trim line, including the mask positioning studs oriented therein, and the sealing edge therearound should be free of both graphite and aluminum.

One of the conventional procedures for fabricating the basic windowed webbing portion of the screen structure is comprised of coating the interior of the panel with a negative photosensitized material, such as dichromated aqueous-alcohol solution of polyvinyl alcohol. The multi-apertured shadowmask is thence positioned within the coated panel, whereupon exposure radiation emanating from a discretely positioned UV emitter is directed through the multiple openings of the patterned mask to polymerize a similarly-shaped pattern in the sensitized coating therebeneath. In a three-color element screen, such exposure is effected three times, the radiation for each exposure emanating from differently located radiant energy emitter. Following exposure, the apertured mask member is removed from the panel, and the exposed coating developed to remove the unpolymerized areas, thereby providing a basic polymerized screen format pattern surrounded by a web pattern of substantially bare glass. The whole of the interior of the panel is then overcoated with an opaque colloidal suspension of graphite; whereupon, the interior of the panel is treated with an appropriate degrading agent to effect an effervescent degradation of the polymerized portions of the patterned screen format. This effervescent degradation of the polymerized window areas also loosens the associated graphite overcoating the polymerized material. The loosened materials are then removed by water development to produce an opaque interstitial web having multitudinous windows therein defining bare glass areas wherein the respective phosphor elements of the screen structure are subsequently disposed. Since the aforedescribed degradation affects polymerized areas which are solely related to the viewing area of the panel, the balance of the panel including the sidewall, the mask positioning studs therein, and the sealing edge therearound, remain coated with graphite.

By one conventional procedure, the extraneous graphite coating is removed from the panel edge and a portion of the adjacent sidewall by immersing the sealing edge of the panel into a suitable acid solution which chemically etches away the undesired graphite coating, trimming it to the level determined by the depth of immersion. While this method efficiently removes the graphite from the sealing edge, it manifests two deleterious results. First, by immersing the panel into the acid solution far enough to remove graphite from the mask positioning studs, there is the inherent danger of splashing acid upon the already-formed windowed webbing of the basic screen structure. Any minute droplets of acid splashed upon this critical area destroys the constancy of the pattern, thereby rendering the panel unusable for tube fabrication. To minimize such acid damage, only shallow immersion of the panel sidewall is usually employed, whereupon it is necessary to clean the mask positioning studs by manual techniques, the results of which, are not uniformly consistent. Secondly, the acid immersion process of removing the graphite coating from the panel sidewall often results in the formation of a trim line having a jagged edge. Aside from the undesirable aesthetic appearance of panels trimmed by this procedure, there is a possibility that upon aluminizing, portions of the jagged graphite trim line may exhibit poor adherence and eventually produce loose particles within the tube. Thus, the conventional procedures evidence drawbacks that are deleterious to achieving the desired high quality results.

OBJECTS AND SUMMARY OF THE INVENTION

It is an object of the invention to reduce the aforementioned disadvantages by providing apparatus for fabricating a color cathode ray tube face panel wherein the basic windowed webbing of the screen structure is peripherally defined by a bare glass sidewall wherein the mask positioning means and the sealing edge thereof are free of coatings and particulate matter. Another object is to achieve the aforementioned results in a manner involving a minimum of additional steps to the panel fabrication process. A further object is to provide apparatus for panel fabrication that is easily adaptable to production techniques.

These and other objects and advantages are achieved in one aspect of the invention by providing improved means for fabricating the basic window pattern portion of a color cathode ray tube screen structure formed on the interior surface of the viewing area of the face panel. This basic pattern structure is an array of multitudinous window openings, defined by an opaque lace-like interstitial webbing, formed on the viewing area of the panel by controlled exposure of a negative radiant energy sensitive coating applied to the interior of the panel. The exposure of this sensitized coating is effected by radiant energy projected from a predeterminately positioned primary emission source, and discretely directed through the openings of a proximally associated apertured mask member, spatially oriented within the panel, to impinge the coating on the viewing area and provide a latent polymerized image of the window pattern therein. The mask member is then removed, and in accordance with the invention, the panel is positioned to facilitate the orientation of an areal internal shielding member within the coated panel at a location substantially intermediate the viewing area and the mask poisitioning means embedded in the panel sidewall. This shielding member provides protection for the priorly-formed latent imagery of the window pattern during subsequent exposure of the panel. At least one secondary emitter of radiant energy is oriented relative to the shielding member and the sidewall of the panel, whereupon exposure of only that portion of the radiant energy sensitive coating disposed on the sidewall is effected by a directed flood of radiant energy to provide a defined peripheral band of polymerized coating on the wall. The shielding member and the secondary emission means are thence removed from the vicinity of the panel, whereupon the diversely exposed areas of the coating on the interior of the panel are developed to remove the unexposed portions thereby providing a pattern of polymerized window areas on the viewing portion and a polymerized band on the panel sidewall. The interior of the panel is then conventionally overcoated with an opaque graphite material, and treated with a degrading agent to loosen and remove therefrom the polymerized material, along with the graphite desposited thereon. Removal of the degradation materials provided the interstitially defined window webbing of the basic screen structure on the viewing area which is circumscribed by a substantially bare glass sidewall wherein the mask positioning means and the terminal sealing edge therearound are free of coatings and particulate materials.

At this state of fabrication, the panel has been prepared for the deposition of the respective phosphor elements comprising the color screen pattern.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

In those color cathode ray tubes employing a basic patterned windowed webbing in the screen structure, it has been a customary practice to fabricate the window web on the interior surface of the viewing portion of the face panel prior to the deposition of the respective cathodoluminescent elements of the screen per se. In this instance, a basic screen structure embodying an array of substantially circular-shaped windows such as those associated with a conventional tri-dot color screen, will be exemplarily delineated.

Figure 1:
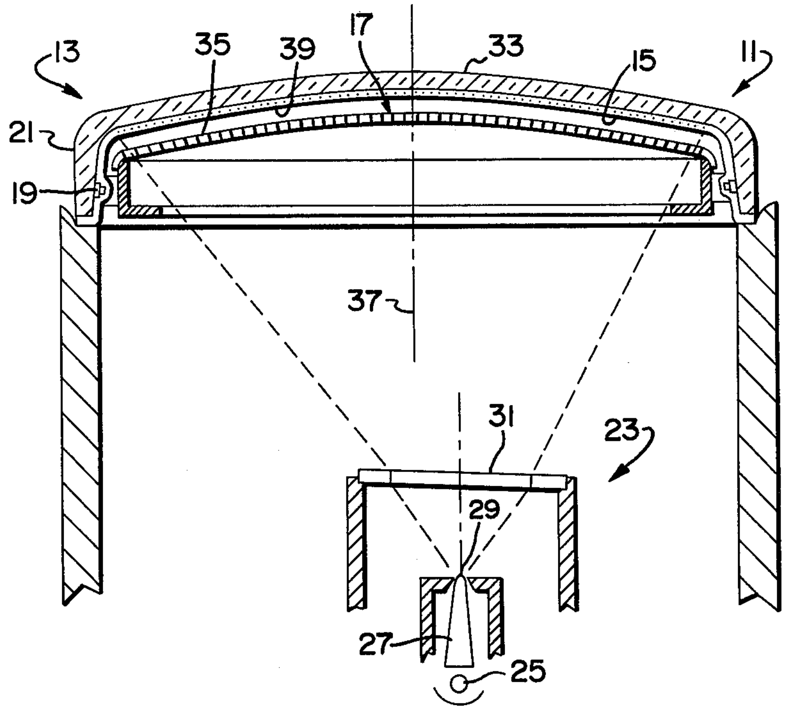
Fig. 1 PRIOR ART
FIG. 1 is a prior art view illustrating the apparatus and process for forming the latent pattern imagery on the viewing area of the face panel.

With reference to the drawings, there is shown in FIG. 1 a prior art view of the exposure means 11 employed in forming the discretely patterned windowed webbing on the face panel 13. Since the windows in the webbing are identical to the subsequent placement of respective phosphor elements comprising the screen, the exposure apparatus employed in the web formation is substantially identical to that utilized for subsequent disposition of the respective phosphor elements. Prior to the exposure of each of the several window patterns comprising the webbing, the interior surface of the panel is coated with a light hardenable negative photo-sensitive substance 15, such as dichromate sensitized polyvinyl alcohol, which is well known in the art. A multi-apertured shadowmask 17 is then oriented within the face panel on a plurality of spatially related mask positioning studs 19 partially embedded in the sidewall 21 of the panel. The mated mask-panel assembly is then suitably positioned on the primary exposure apparatus 11, wherein there are means for predeterminately positioning an optical system 23 comprising a radiant energy emitter 25, such as a ultra-violet emitting mercury vapor lamp, an associated tapered collector rod 27 terminally formed to provide a substantially point source of radiation 29, and a conjunctive light-refractive medium or lens 31. In the primary exposure step, discrete areas of the coated viewing portion 33 of the panel are subjected to radiation emanating from the tip of the collector rod 27, refracted by the lens 31 and directed through the mask apertures 35 to impinge the photo-sensitive coating 15 on the viewing area of the panel. The discrete areas of the coating thus impinged are polymerized and adhered to the interior surface of the viewing area 33 to form a latent imprint of the window areas comprising the first pattern of the basic screen structure. This primary exposure step is twice repeated to dispose window imprints for the remaining elements comprising the screen combination. For the separate primary exposure of each of the respective window patterns, the components of the optical system, i.e., the radiant energy emitter 25, the associated collector rod 27 and the light-refractive medium 31 are properly repositioned and offset from the axis 37 of the panel; the optical system being shifted substantially 120° about the central axis for each subsequent pattern exposure. It is to be noted that these multiple primary exposure steps have treated only the viewing area 33 of the panel, whereupon only the latent imagery 39 of the respective windowed patterns are effected as multitudinous polymerized areas surrounded by unpolymerized material, which extensively includes the coating covering the panel sidewall 21 and mask positioning studs 19 embedded therein. In the drawings, the thickness of the photo-sensitive coating 15 is accentuated to aid clarification of the description.

After removing the apertured shadowmask 17 from the face panel 13, it has been conventional procedure to develop the exposed panel and thus remove the unexposed and unpolymerized negative photo-sensitive material, thereby providing a web pattern of substantially bare glass defining the interstitial spacings between the substantially clear polymerized window areas. Such development, also removes the unexposed coating from the panel sidewall and studs therein. The process improvement of the invention, dispenses with the foregoing development step at this stage of the panel fabrication process. In place thereof and in accordance with the invention, additional discrete exposure of the panel is effected before the developing step is accomplished.

Figure 2:
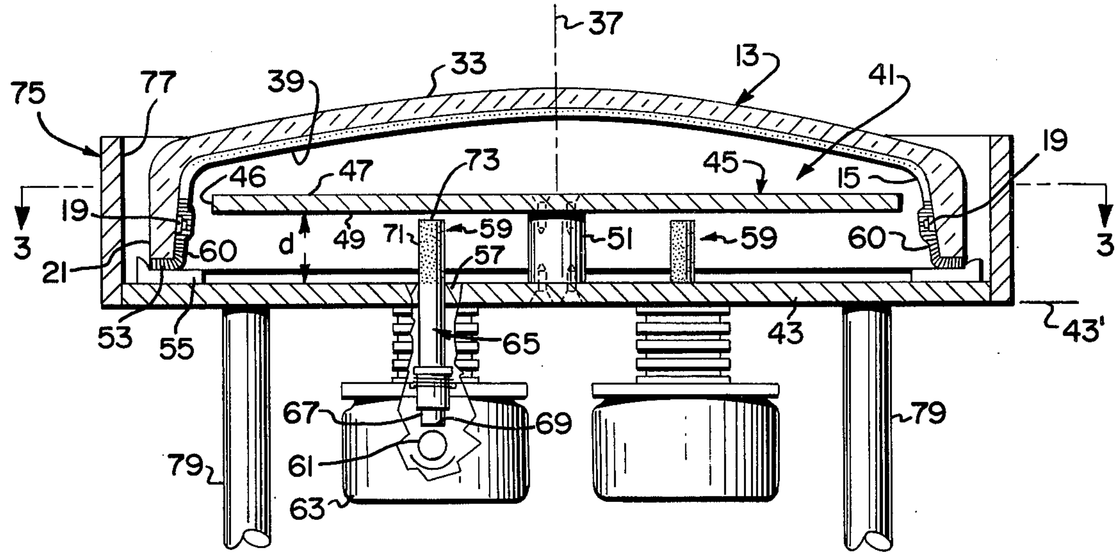
FIG. 2 is a sectional view of one embodiment of the invention illustrating means for exposing only a discrete circumferential area of the panel sidewall.
Figure 3:
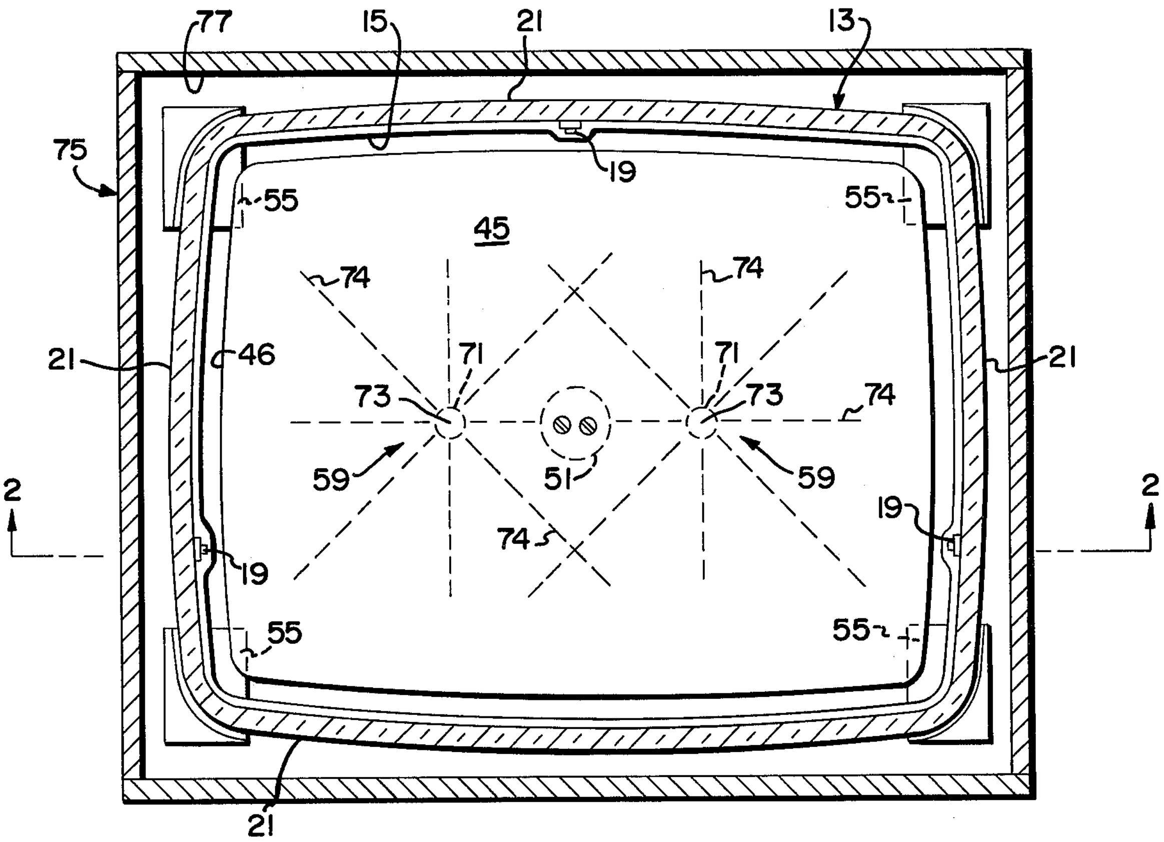
FIG. 3 is a plan view of the embodiment shown in FIG. 2 taken along the line 3—3 thereof.

Following the aforedescribed multiple exposures of the coating on the viewing area 33, the shadowmask 17 is removed from the interior of the panel, whereupon the coated panel is repositioned for further exposure. Attention is directed to FIGS. 2 and 3 wherein one embodiment of the additional exposure means 41 is illustrated. This exemplary exposure structure includes a base member 43 having a defining plane 43' from which an areal shielding member 45, having top 47 and bottom 49 surfaces, is supported in a standoff manner from the base member by a centrally oriented support means 51 which effects minimal shadowing of the exposure radiation. The shielding member 45 being preferably of metal, such as aluminum, is perimetrically contoured and dimensioned with sufficient clearance to be positioned within the panel in a manner to shield the priorly exposed viewing area 33 thereof. In certain instances, the peripheral edge 46 of the shielding member may be fitted with a shallow skirt, contoured to cast a particularly definitive shadow on the sidewall, to substantially match the contour of the aluminum film subsequently applied over the screen area. To consummate the positioning of the panel 13 and the shielding member 45 in the desired relationship, the sealing edge portion 53 of the panel is accommondated by a plurality of panel positioning means 55 located on the base member 43. Since the height of these positioning means is a controllable variable in the apparatus, the orientation of the shielding means 45 within the panel, which defines the resultant cut-off line of secondary exposure along the sidewall, is substantially determined by the height of the panel positioning means 55 relative to the height of the shielding member standoff support 51.

Protruding from suitable apertures 57 related to the base member 43 are a plurality of secondary radiant energy exposure means 59 which are oriented within the interior confines of the panel in the region proximal to the bottom surface 49 of the shielding member 45; such surface being desirably reflective. In this first embodiment, at least two spaced apart emitter means 59 are positioned to beam exposure radiation in a manner substantially normal to the axis 37 of the panel toward the sidewall region 21 of the panel, within the region defined by the related planes of the base and shielding members, to effect photo-polymerization of a defined band 60 of the sidewall-disposed coating. These respective light emission means 59 are each comprised of a brilliant source of radiant energy 61, such as a conventional mercury vapor lamp and associated reflective means; such being suitably encompassed within a compatible enclosure 63 located outward of the sealing edge 53 of the panel. Functionally related to the light source, is a transparent energy transmission medium in the form of a substantially cylindrical collector rod 65, formed for example of homogeneous vitreous silica, to provide effective transmission of actinic radiant energy from the light source to the selected internal region of the panel. This cylindrical collector 65 has an input portion 67 with the proximal end surface thereof 69 associated with the light source 61, and an output portion 71 having a distal end surface 73 oriented within the panel relative to the reflective bottom surface 49 of the areal shielding means. The cylindrical surface of the output portion 71 of the collector is abraded to provide a radiation emissive surface oriented to direct rays of actinic exposure energy 74 toward the panel sidewall 21. The length of the longitudinal output portion 71 of the collector does not exceed the distance *d* between the base member 43 and the shielding member 45. Normally, the exterior cylindrical surface of the collector rod 65 is polished except for the extensive abraded output portion 71. Since the distal end surface 73 is located close or contiguous to the reflective bottom surface 49 of the shielding member, any light projected through the distal end is reflected by the shielding member to augment the laterally directed actinic exposure radiation emanating from the collector rod. The exposure apparatus 41 utilizes an associated enclosure means in the form of a continuous wall 75 constructed perpendicular to the base member 43 in a manner to spatially encompass the sidewall portion of the panel. The internal surface of the wall 77 is of a flat black finish to minimize reflections, and the height of the wall is of a dimension to confine and restrict the secondary exposure radiation to the desired perimetrical area of the panel sidewall 21.

The wall-enclosed apparatus is positionally maintained by suitable support means, as for example 79. Such apparatus support means may be vertically movable or stationary, depending on whether the exposure apparatus 41 is moved into a positioned panel, or the panel moved for placement on the apparatus.

Simultaneous excitation of these respective radiant energy emitters 59 exposes only that portion of the the photosensitive coating 15 that is disposed on the wall of the panel including that covering the mask positioning studs 19. As a result, this confined and directed flood of secondary exposure radiation beneficially provides a defined band of polymerized coating 81 upon the sidewall of the panel.

Upon being subjected to secondary exposure, the panel is thence removed from the shielding member and the associated secondary emission means, whereupon the diversely exposed areas of coating on the interior of the panel are developed according to conventional procedure to remove the unexposed portions. The development step provides a pattern of polymerized window areas on the viewing portion 33 and a definitive polymerized band on the sidewall 21. Following development, the interior of the panel is conventionally overcoated with an opaque material such as a colloidal suspension of graphite in a water-alcohol solution. After drying, the interior of the panel is commonly treated with a degrading agent, such as hydrogen peroxide, to loosen and remove therefrom the polymerized material along with the opaque material deposited thereon. Thus, there is provided the interstitially defined windowed webbing of the screen area which is circumscribed by a bare glass sidewall 21 wherein the mask positioning studs 19 and the sealing edge 53 therearound are free of coatings.

Figure 4:
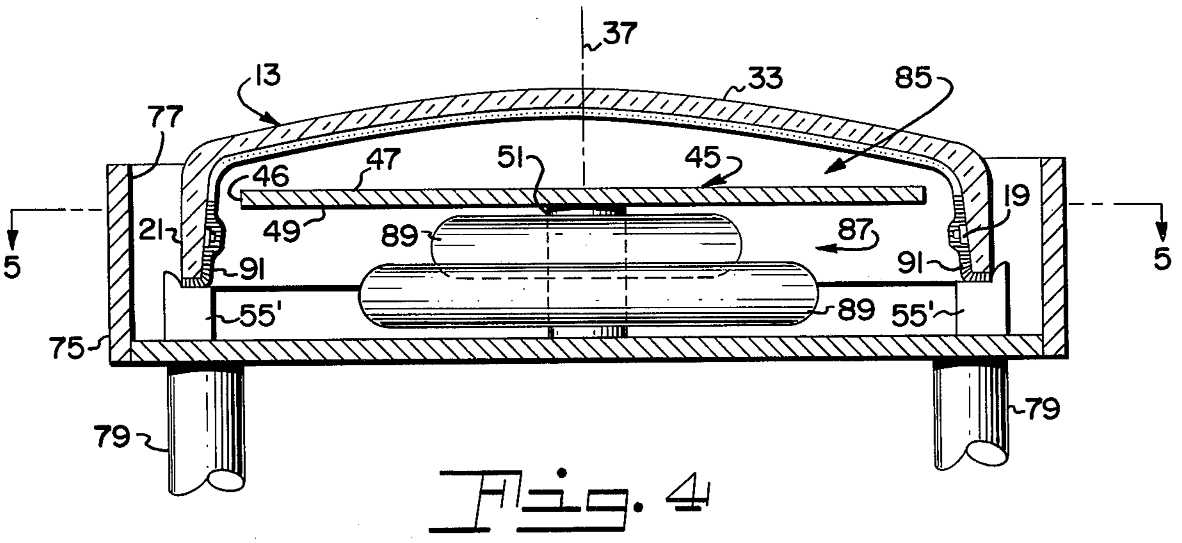
FIG. 4 is a sectional view illustrating a second embodiment of the invention wherein the sidewall of the panel is exposed.
Figure 5:
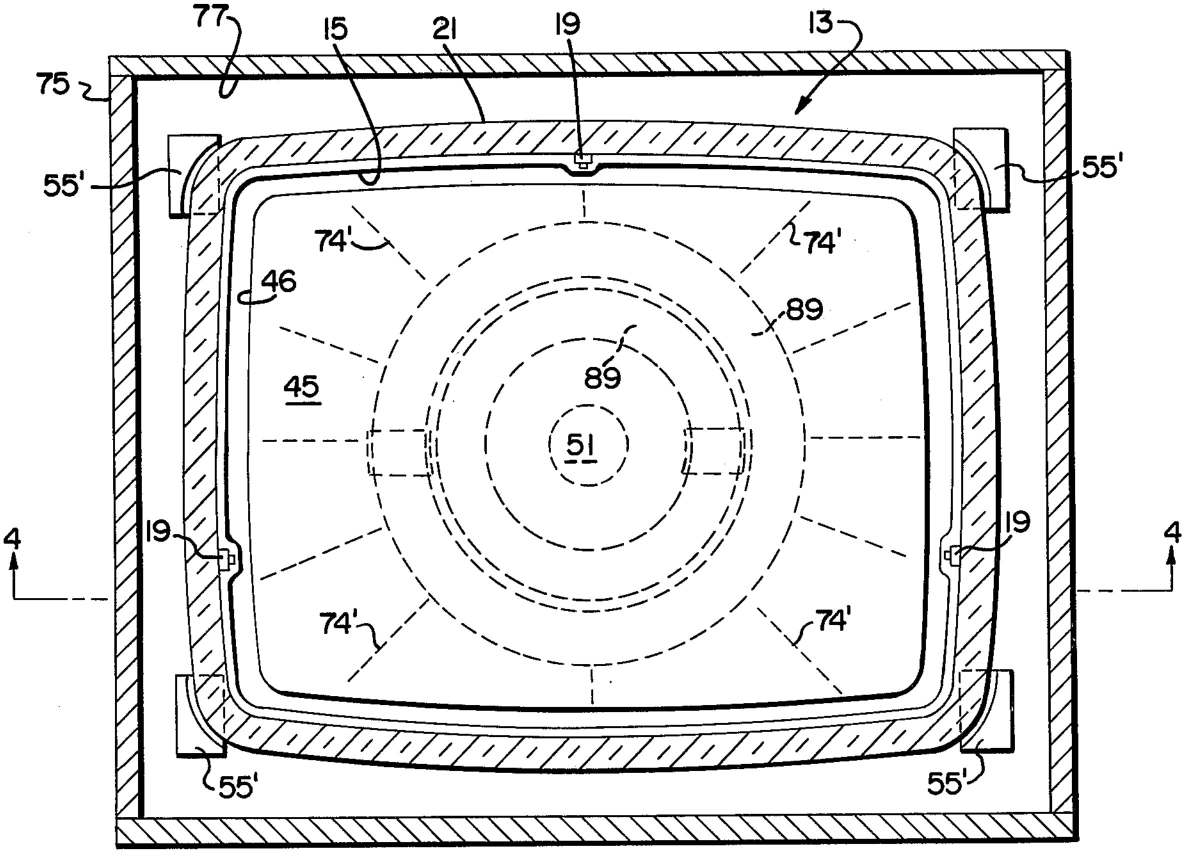
FIG. 5 is a plan view of the embodiment illustrated in FIG. 4 taken along the line 5—5 thereof.

For a second embodiment 85 of the invention, attention is directed to FIGS. 4 and 5 wherein an areal shielding member 45 having a bottom reflective surface 49, such as that disclosed in the previous embodiment, is similarly positioned within the panel to shield the previously exposed latent imagery on the viewing area 33. In this embodiment, the secondary radiant energy emission means 87 is likewise positioned within the confines of the panel, the panel being suitably supported by panel positioning means 55' which are similar to those employed in the first embodiment 41. In this instance, the discrete exposure of the wall-disposed energy sensitive coating 15 is effected by utilizing radiation emanating from at least one substantially continuous tubular secondary emissive means 89, such as an ultraviolet emitting Circuline lamp as manufactured by GTE Sylvania Incorporated, Danvers, Mass. A plurality of such lamps positioned in a nesting arrangement, about the centrally oriented support means 51, as shown in the FIGS. 4 and 5, are employed in spatial relationship to the circumscribing panel sidewall 21 in a manner to direct rays of secondary exposure radiation 74' to the coated sidewall. The circular fluorescent lamps of this embodiment are particularly adaptable for supplying exposure radiation to the sidewalls of face panels having interior dimensionings large enough to accommodate such means. Although not shown, the circular lamps are supported by conventional means relative to the base member 43, and are positioned to direct exposure radiation in a manner substantially normal to the axis of the panel 37 within the region demarcated by the base 43 and shielding 45 members to effect photo-polymerization of a defined band 91 of the sensitized coating 15 disposed on the panel sidewall 21. The apparatus of the second embodiment 85 likewise utilizes a surrounding enclosure wall 75 having a flat black interior finish 77 to confine and restrict the secondary exposure radiation to the desired circumferential area of the panel sidewall 21.

Figure 6:
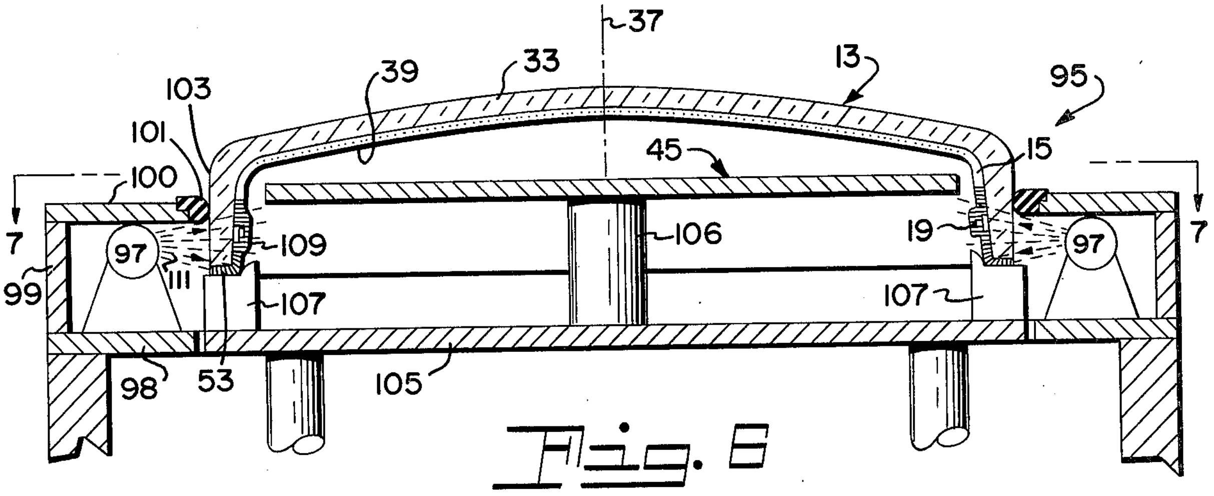
FIG. 6 is a sectional illustrating another embodiment of the invention wherein the panel sidewall is exposed by radiation emanating from an exterior source.
Figure 7:
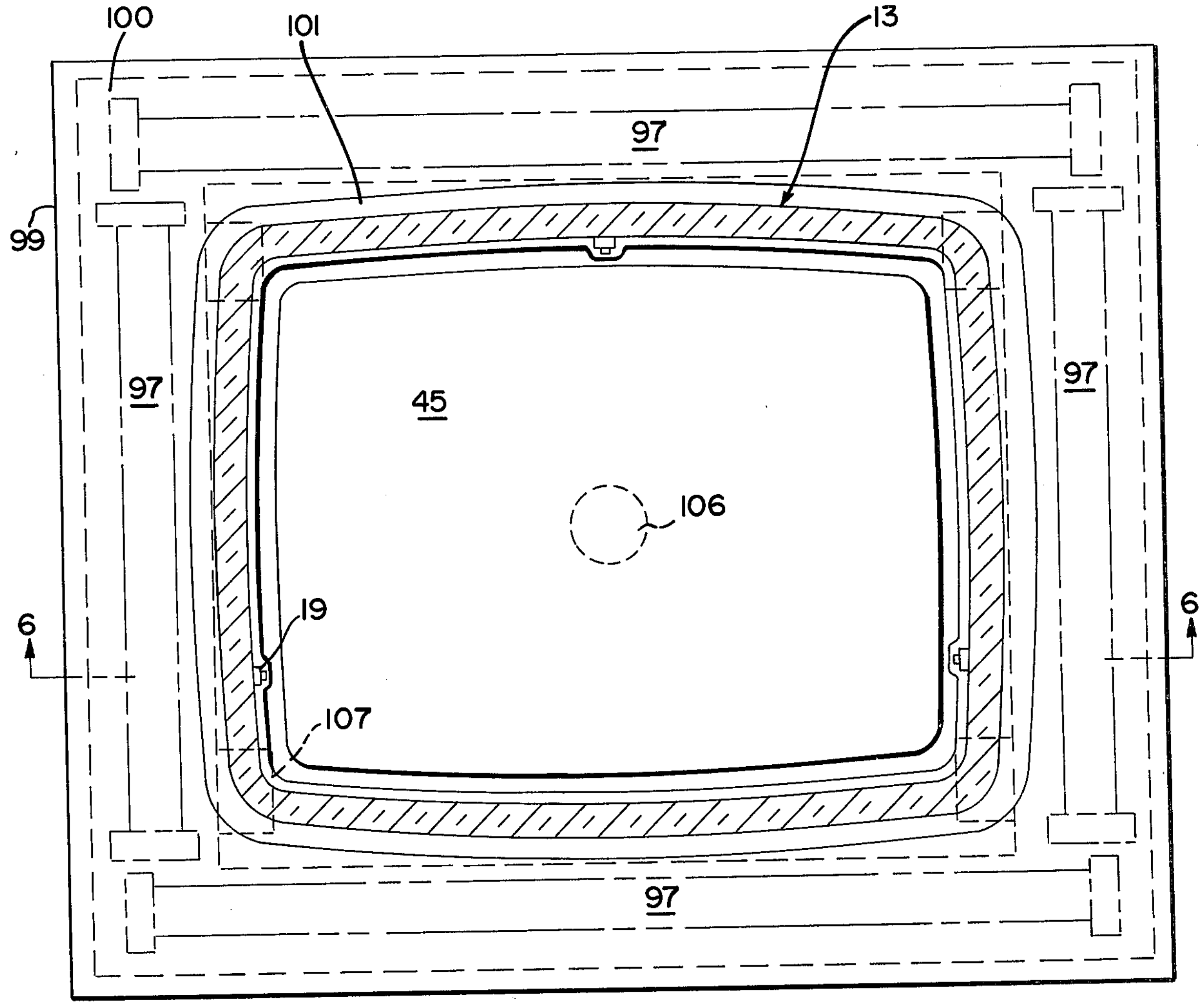
FIG. 7 is a plan view of the embodiment illustrated in FIG. 6 taken along the line 7—7 thereof.

A further or third embodiment of 95 of the invention is delineated in FIGS. 6 and 7 of the drawings. In this consideration, the distinct exposure of the wall-disposed photo-sensitive coating 15 is accomplished by utilizing radiant energy emanating from a plurality of substantially longitudinal secondary emitters 97, such as ultraviolet or fluorescent lamps, oriented in a common plane in a substantially continuous manner in spatial relationship to the exterior surface of the sidewall 21 of the panel. The plane of orientation for these longitudinal lamps is substantially parallel with the plane of the sealing edge 53 of the panel. The lamps are positioned by conventional means located on a support base 98, and are encompassed by a surrounding wall 99.

Auxiliary shielding means 100, associated with the surrounding wall 99 and the exteriorly positioned logitudinal secondary radiant energy emitters 97, is formed to have an opening contoured to the external shaping of the panel 13. The edge portion 101 of the auxiliary shielding means is of a resilient material, such as rubber, to provide a contiguous encompassing contact with the external surface 103 of the panel to thereby confine the exposure radiation to a defined area of the exterior sidewall portion of the panel. The central base member 105 of the exposure apparatus 95, from which the areal shielding member 45 is supported by means 106 and which also accommodates the panel positioning means 107, is vertically movable relative to the surrounding array of longitudinal radiant energy emitters 97. Thus, with the sealing edge 53 of the panel resting upon the panel positioning means 107, the panel may be oriented relative to the surrounding auxiliary shielding means 99 to provide a defined trim-line confining the exposure radiation to a definite area of the sidewall portion 21 of the panel, thence traversing therethrough to photo-polymerize a defined band of coating 109 on the interior surface of the sidewall. The useful exposure radiation 111 emanating from the lamps 97 is directed in a manner substantially normal to the axis 37 of the panel.

Figure 8:
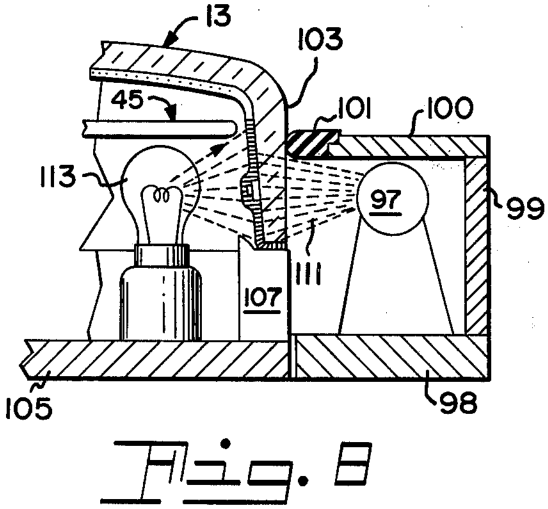
FIGS. 8 and 9 are partial sectionals illustrating localized auxiliary augmentive exposure means interiorly positioned within the panel relative to the exteriorly positioned secondary radiation means as illustrated in FIGS. 6 and 7.
Figure 9:
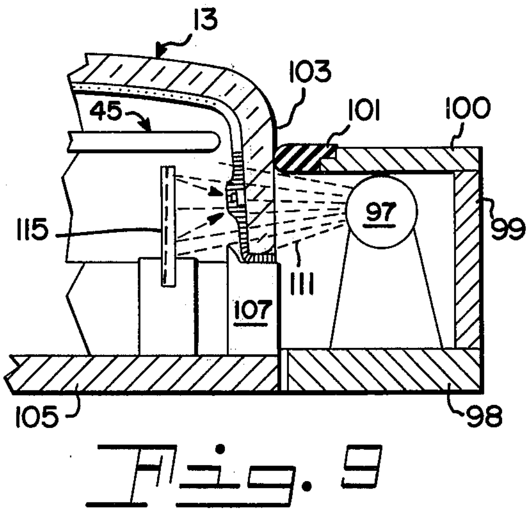

When employing the third embodiment 95 of exposure, wherein the exposure radiant energy emanates from externally positioned sources 97, it has been found that polymerization of the photosensitive coating 15, covering the mask positioning studs 19, can be expedited by utilizing localized auxiliary radiant energy emission means 113, such as UV emitting lamps, discretely positioned within the panel enclosure in a manner adjacent to each of the mask positioning studs 19. Such adjuvant radiation means is illustrated in FIG. 8. Another localized auxiliary exposure means is shown in FIG. 9 wherein a concave mirror 115 is discretely positioned within the panel enclosure adjacent to each mask positioning stud 19 to effect reflection of a portion of the exposure radiation 111 onto the coated stud thereby expediting polymerization of the coating 15 covering the respective studs.

Thus, there is provided process conjunctive apparatus means for expeditiously fabricating a color cathode ray tube face panel wherein the basic windowed webbing of the screen structure is peripherally bordered by a defined trim-line, effecting therefrom a bare glass sidewall wherein the mask positioning means and the seal edge of the panel are free of coatings and deleterious particulate matter. The results are achieved with a minimum number of additional steps in the panel fabrication process, and the nature of the invention is such that it is easily adaptable to production techniques for panel fabrication.

While there have been shown and described what are presently considered the improved embodiments of the invention, it will be obvious to those skilled in the art that various changes and modifications may be made therein without departing from the scope of the invention as defined by the appended claims.

What is claimed is:

1. In relationship to a color cathode ray tube glass face panel having a viewing area with an axis therethrough and peripherally defined by a circumferential skirt-like sidewall portion having a plurality of spaced-apart mask supporting means embedded therein and terminated by a continuous sealing edge therearound, apparatus means for photo-exposing a substantially defined band-like area of radiant energy sensitive coating disposed on the interior surface of said sidewall, said apparatus comprising:

a base member having a defining plane;

an areal shielding member having top and bottom surfaces supported in a stand-off manner from said base member, said shielding member being perimetrically contoured and dimensioned to be positioned within said panel in a manner to shield the viewing area thereof, said shielding member being oriented in a plane whereof the bottom surface is parallel with the plane of said panel sealing edge and the plane of said base member;

panel positioning means located on said base member and shaped to accommodate the edge portion of said panel, the positioning of said shielding means within said panel being determined by the height of said panel supporting means relative to the height of said shielding member standoff support;

radiant energy emission means positioned to beam exposure radiation in a manner substantially normal to the axis of said panel within the region defined by the related planes of said base and said shielding members to effect photo-polymerization of a defined band of the sidewall disposed coating; and enclosure means in the form of a continuous wall spatially encompassing the sidewall portion of the panel to confine and restrict said exposure radiation to the desired perimetrical area of said panel sidewall.

2. A cathode ray tube panel sidewall exposure apparatus according to claim 1 wherein the bottom surface of said shielding member has a reflective finish.

3. A cathode ray tube panel sidewall exposure apparatus according to claim 1 wherein said radiant energy emission means are oriented substantially within the interior confines of said panel in the region proximal to the bottom surface of said shielding member.

4. A cathode ray tube panel sidewall exposure apparatus according to claim 3 wherein said radiant energy emission means are in the form of at least two spaced apart sources of exposure energy oriented substantially within the confines of said panel in a manner to direct exposure radiation toward the wall of said panel.

5. A cathode ray tube panel sidewall exposure apparatus according to claim 3 wherein said radiant energy emission means is in the form of substantially continuous tubular source of energy oriented substantially within the confines of said panel in a plane parallel with said shielding member.

6. The cathode ray tube panel sidewall exposure apparatus according to claim 1 wherein said radiant energy emission means are oriented substantially exteriorly of the panel in a substantially perimetrical manner thereabout to predeterminately direct radiation through the glass sidewall to effect the polymerization of a defined band of the interiorly disposed coating thereon, said exterior energy emitters having auxiliary shielding means to provide a perimetrical cut-off line of radiation around the sidewall of said panel.

7. The cathode ray tube panel sidewall exposure apparatus according to claim 6 wherein said radiant energy emission means are in the form of a plurality of tubular longitudinal emitters arranged in a common plane in a substantially continuous manner in spatial relationship to the exterior perimeter of said panel and substantially parallel with the plane of the sealing edge of said panel.

8. The cathode ray tube panel sidewall exposure apparatus according to claim 1 wherein the shielding member support means extending from said base member is oriented in substantially the center of said shielding member.

* * * * *